United States Patent

Isaac

(10) Patent No.: US 7,412,313 B2
(45) Date of Patent: Aug. 12, 2008

(54) MAINTENANCE ASSISTANCE FOR A VEHICLE

(75) Inventor: Emad S. Isaac, Woodridge, IL (US)

(73) Assignee: Temic Automotive of North America, Inc., Deer Park, IL (US)

( * ) Notice: Subject to any disclaimer, the term of this patent is extended or adjusted under 35 U.S.C. 154(b) by 244 days.

(21) Appl. No.: 10/752,865

(22) Filed: Jan. 7, 2004

(65) Prior Publication Data

US 2005/0149250 A1 Jul. 7, 2005

(51) Int. Cl.
*G01M 17/00* (2006.01)
(52) U.S. Cl. .......................... 701/29; 701/123
(58) Field of Classification Search .............. 701/29–34, 701/123, 213
See application file for complete search history.

(56) References Cited

U.S. PATENT DOCUMENTS

| | | | | |
|---|---|---|---|---|
| 4,642,775 A | | 2/1987 | Cline et al. ................. 701/200 |
| 6,028,537 A | * | 2/2000 | Suman et al. ................ 340/988 |
| 6,151,539 A | * | 11/2000 | Bergholz et al. .............. 701/25 |
| 6,461,311 B2 | | 10/2002 | DuBois et al. | |
| 6,494,894 B2 | | 12/2002 | Mirarchi | |
| 6,540,698 B1 | | 4/2003 | Ishii | |
| 6,569,107 B2 | | 5/2003 | Jalisi et al. | |
| 6,591,185 B1 | | 7/2003 | Polidi et al. ................ 701/201 |
| 6,922,616 B2 | * | 7/2005 | Obradovich et al. ........... 701/1 |
| 6,954,697 B1 | * | 10/2005 | Smith ....................... 701/209 |
| 2003/0023190 A1 | | 1/2003 | Cox | |
| 2003/0032897 A1 | | 2/2003 | Burmeiser et al. | |
| 2003/0069684 A1 | | 4/2003 | Reimer | |
| 2004/0093155 A1 | * | 5/2004 | Simonds et al. ............. 701/200 |
| 2004/0128067 A1 | | 7/2004 | Smity ........................ 701/207 |
| 2004/0204845 A1 | * | 10/2004 | Wong ........................ 701/210 |
| 2004/0236504 A1 | | 11/2004 | Bickford et al. ............. 701/207 |
| 2004/0254723 A1 | * | 12/2004 | Tu ............................ 701/209 |

\* cited by examiner

*Primary Examiner*—Mark Hellner

(57) ABSTRACT

A system and method to provide navigational maintenance assistance for a vehicle includes a first step of estimating when the vehicle will require maintenance. A next step includes establishing a location and direction of travel of the vehicle. A next step includes searching a database for any service stations within a range of the vehicle and ahead of the location of the vehicle in the direction of travel of the vehicle before the vehicle becomes disabled. This step can be provided by a remote service provider. A next step includes presenting the found service stations from the searching step to a driver of the vehicle via a user interface.

10 Claims, 4 Drawing Sheets

MAINTENANCE ASSISTANCE FOR A VEHICLE

FIELD OF THE INVENTION

The present invention relates generally to navigation systems. More particularly, the invention is directed to a providing maintenance assistance using a navigation system and a database of service stations.

BACKGROUND OF THE INVENTION

Wireless communication technology, such as is used with cellular phones or in-vehicle communications such as Telematics systems, is becoming much more sophisticated as the technology evolves. Presently, wireless communication systems and devices have the capability to not only provide communication between people, but also can acquire and provide different types of content including information from various sources.

For example, there are presently many different types of navigation systems that will direct a driver of a vehicle from a starting point to a destination point. These systems generally give audio or visual indications of a particular route to take to arrive at the desired destination. Some navigation systems go further by providing supplementary information to a driver at a particular location. For example, systems can provide location-based advertising that gives a driver a list of available products or services within a radius of the present location of the vehicle. However, one serious drawback to these systems is that a driver may not want to reverse directions to go back to a vendor that the driver has already passed along the driver's route. Moreover, a driver may be subject to a high number of unsolicited and undesired advertisements, which will be distracting to the driver. In addition, it is envisioned that many of these advertisement would not be applicable to a particular vehicle or driver.

What is needed is a method and system to provide navigational information for a driver of a vehicle to obtain maintenance. It would be an advantage to have such navigational information direct the driver to a location ahead of the driver in a direction of travel of the vehicle. Further, it would be of benefit to predict when maintenance is needed and direct the driver to a location providing a corresponding product or service before the vehicle is disabled. It would also be of benefit to tailor the information content in accordance with driver preferences.

DETAILED DESCRIPTION OF THE PREFERRED EMBODIMENTS

Figure 1:
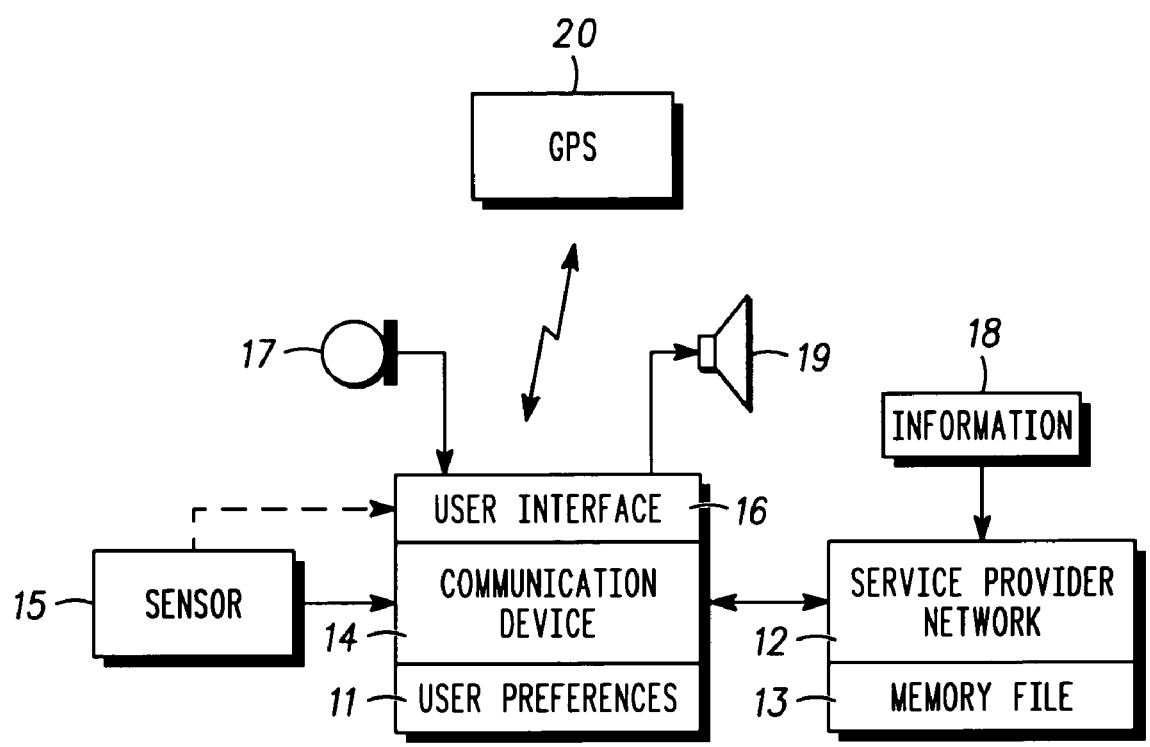
FIG. 1 illustrates a simplified block diagram of a communication system for navigational maintenance assistance, in accordance with the present invention.

The present invention provides a method and system to provide navigational information for a driver of a vehicle to obtain maintenance, such as refueling for example. It would be an advantage to have such navigational information direct the driver to a location ahead of the driver in a direction of travel of the vehicle. Further, it would be of benefit to predict when maintenance is needed and direct the driver to a location providing a corresponding product or service before the vehicle is disabled. It would also be of benefit to tailor the information content in accordance with driver preferences. For example, a preferred gasoline brand can be specified.

The invention will have application apart from the preferred embodiments described herein, and the description is provided merely to illustrate and describe the invention and it should in no way be taken as limiting of the invention. For example, although a refueling example is presented, any maintenance item of a vehicle can be addressed. While the specification concludes with claims defining the features of the invention that are regarded as novel, it is believed that the invention will be better understood from a consideration of the following description in conjunction with the drawing figures, in which like reference numerals are carried forward. As defined in the invention, a radiotelephone is a communication device that communicates information to a base station using electromagnetic waves in the radio frequency range. In general, the radiotelephone is portable or mobile and is able to receive and transmit, such as a Telematics unit for example. However, the present invention is equally adaptable to any communication device and user interface, be they wireless or wireline.

The concept of the present invention can be advantageously used on any electronic product with data transfer. Preferably, the radiotelephone portion of the communication device is a cellular radiotelephone adapted for personal communication, but may also be a pager, cordless radiotelephone, a personal digital communication cellular radiotelephone, or mobile communication system. The radiotelephone portion is constructed in accordance with a known communication standard, such as the DCS, PCS, GSM, CDMA or TDMA standards as are known in the art, or future digital communication standards that are presently being developed. The radiotelephone portion generally includes a radio frequency (RF) transmitter, an RF receiver, memory, a digital signal processor, and a microprocessor. The electronics incorporated into a vehicle, cellular phone, two-way radio or selective radio receiver, are well known in the art, and can be incorporated into the communication device of the present invention.

Many types of digital communication devices can use the present invention to advantage. By way of example only, the communication device is embodied in a cellular mobile radiotelephone having a conventional cellular radio transceiver circuitry, as is known in the art, and will not be presented here for simplicity. The cellular radiotelephone, includes conventional cellular phone hardware (also not represented for simplicity) such as processors and user interfaces that are integrated in a vehicle, and further includes microprocessing and digital processing circuitry, in accordance with the present invention. Each particular wireline or wireless device will offer opportunities for implementing this concept and the means selected for each application.

A series of specific embodiments are presented, ranging from the abstract to the practical, which illustrate the application of the basic precepts of the invention. Different embodiments will be included as specific examples. Each of which provides an intentional modification of, or addition to, the method and apparatus described herein.

Referring to FIG. 1, the present invention is a system 10 to provide navigational maintenance assistance for a vehicle. The system 10 including a service provider network 12 and a communication device 14, such as a vehicular communication device, with a user interface and transceiver circuitry. The communication device 14 is operable to download navigational information 18 from the service provider network 12, to be provided to the user interface 16, which can include audio device (such as microphone 17 and speaker 19) or display devices (not shown). The navigational information can include locations of service stations and/or navigational information to direct a driver to a service station (herein defined as facilities for maintenance and service including gas stations, automobile repair shops, automobile dealerships, and the like). For example, if the vehicle has geographic location capabilities and an on-board navigation system, the vehicle would only need addresses of service stations to determine its own route. If the vehicle does not have on-board navigation, and the driver requires navigational information from a network service provider, the network service provider can provide a route to selected service stations.

In a preferred embodiment, the system 10 includes at least one sensor 15, such as a fuel level sensor; a positioning device 20 that can determine a location and direction of travel of the vehicle; a database of information 18 on service (refueling) stations and the like; and a processor coupled to the sensor and user interface, and in communication with the positioning device 20 and database of information 18. The processor is operable to estimate a remaining-fuel range of the vehicle or estimate a range for any upcoming or immediately required maintenance, establish a location and direction of travel of the vehicle, and find from the database any service stations within the estimated range of the vehicle and ahead of the location of the vehicle in the direction of travel of the vehicle. The user interface 16 accepts information on the found service stations from the processor and presents the information to a driver of the vehicle.

The processor estimates the remaining-fuel range of the vehicle using an amount of remaining fuel as indicated by the fuel sensor and a mileage rate of the vehicle. Preferably, the system also estimates a time of fuel remaining using a speed of the vehicle, as will be explained below. In a preferred embodiment, the user interface is operable to enter refueling preferences of the driver, and the processor is operable to filter the found refueling stations with the refueling preferences, as will be explained below Using the navigation system 10 described above, a method for navigational maintenance assistance for a vehicle is provided. The techniques described in this application could apply to any maintenance, but is particularly appropriate for those instances when the vehicle could be become disabled if maintenance is not performed. This is particularly applicable to refueling the vehicle. Some key aspects of this method is looking for service stations that are ahead of the vehicle location in the direction of travel of the vehicle, based on driver preference information, and retrieving this information for the driver. Such a method is based upon selection criteria, user location information, direction of travel, and proximity of services stations.

Figure 2:
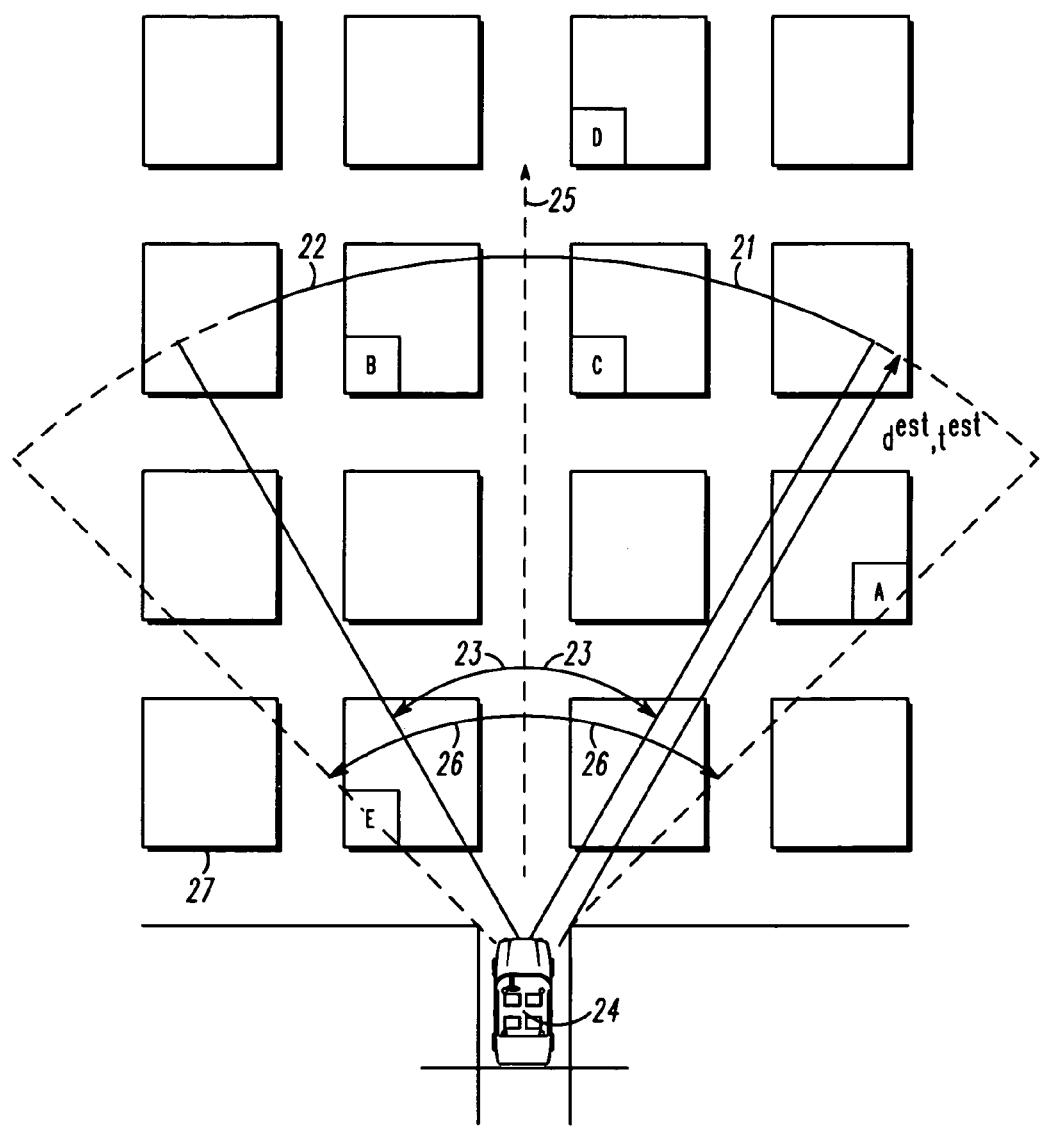
FIG. 2 illustrates a search zone, in accordance with the present invention.

In practice, and referring to FIG. 2, the zone 22 of searching would resemble a pie-shape with an apex at the present location of the vehicle 24 with an axis along the direction of travel of the vehicle and covering a predetermined angular range 23 to either side of the direction of travel 25 of the vehicle 24. The limit of the pie-shape would be defined as the range 21 ($d^{est}$, $t^{est}$) the vehicle can travel before becoming disabled. Preferably, the pie-shape could be greatly modified by the system processor depending on local conditions such as traffic, construction, speed limits, previous travel history on that particular route, etc, and whether the driver already has a planned route change ahead. In these cases the pie-shape may become quite irregular and barely resemble a pie-shape at all, other than to direct the search ahead of the vehicle along a direction of travel of the vehicle.

Figure 4:
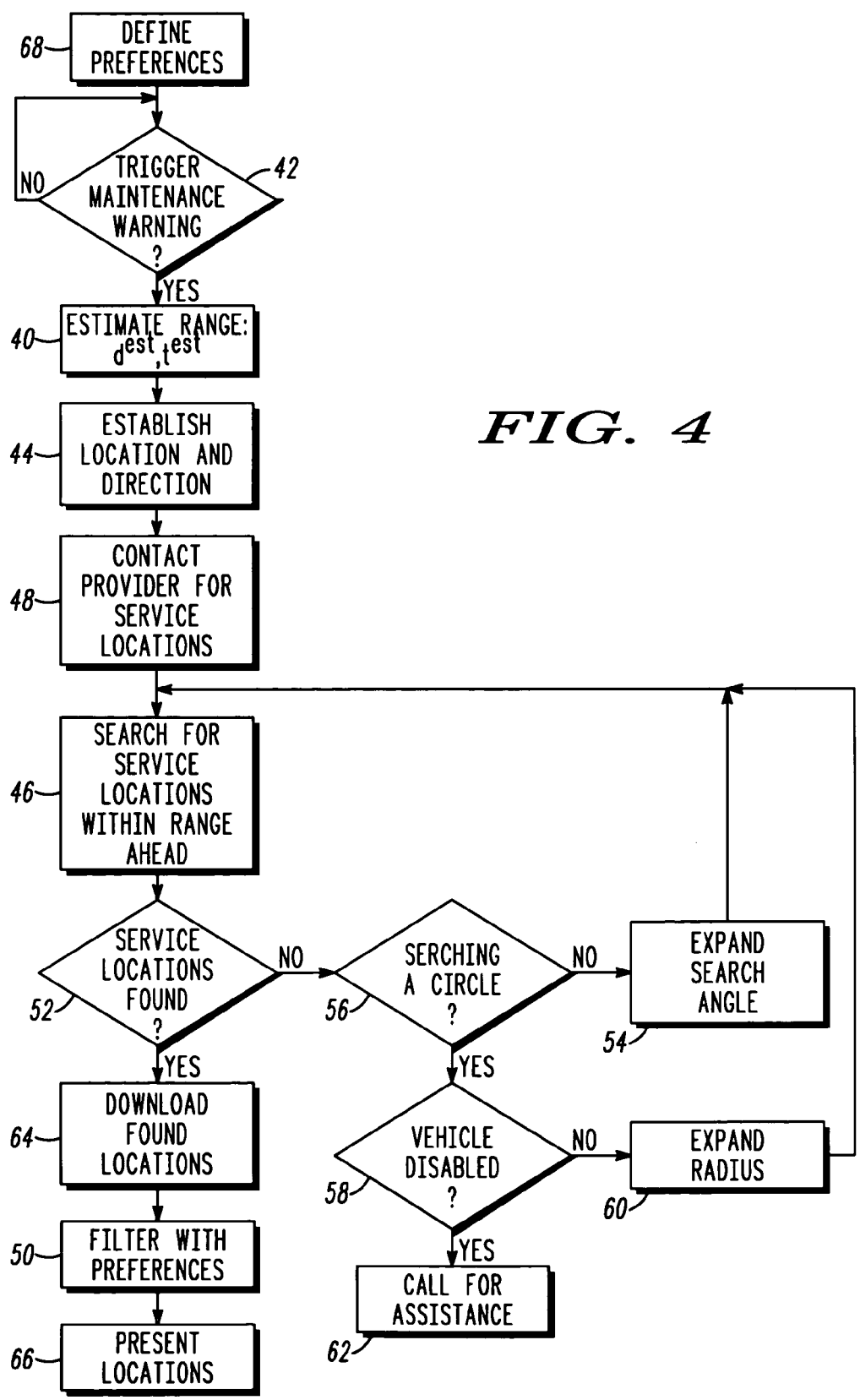
FIG. 4 is a flow chart illustrating a method of navigational maintenance assistance, in accordance with the present invention.

Referring to FIG. 4, a first step of the method includes estimating 40 a range a vehicle can travel before an unattended maintenance task will disable the vehicle. It is envisioned that the most probably maintenance application would be for refueling the vehicle. Preferably, this step is preceded by a triggering step 42 wherein a sensor or diagnostic on the vehicle is used to trigger the method, such as those sensors available with an on-board diagnostics (OBD II) system, as is known in the art. For example, a low fuel level warning, low oil pressure warning, low oil level warning or low coolant level warning could trigger this step, among others. Specifically, a low fuel warning would be dependent upon a predetermined fuel volume that is either measured or estimated. Alternatively, a driver can manually activate the trigger.

Figure 3:
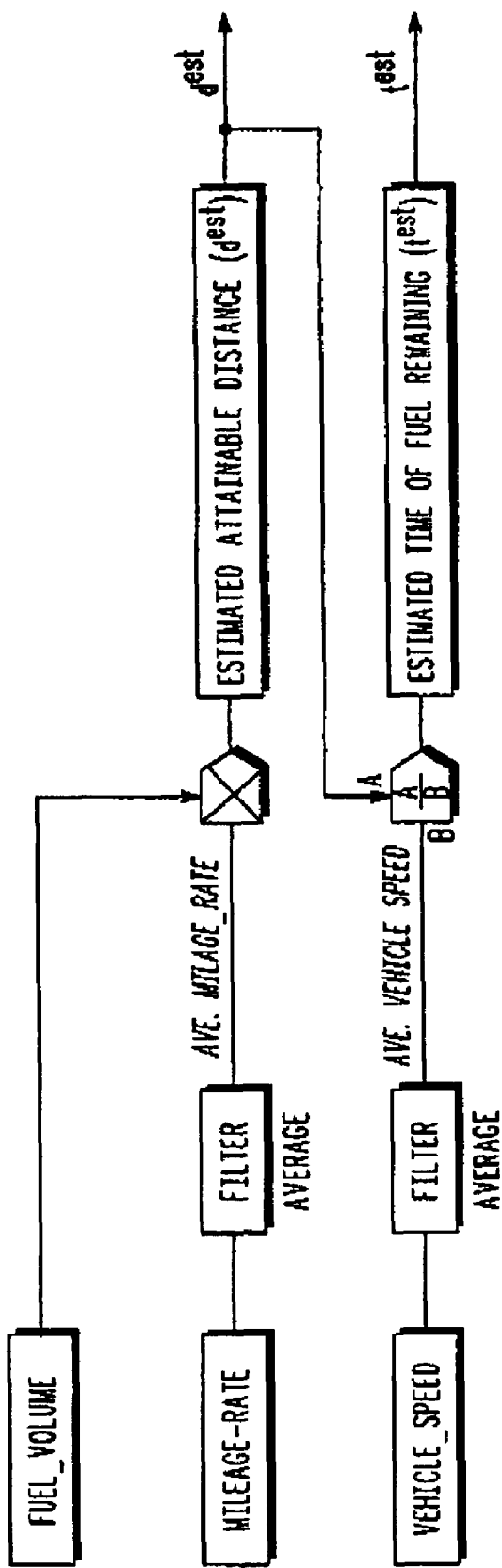
FIG. 3 is a calculation of range, in accordance with the present invention.

Referring to FIG. 3, for refueling maintenance, a remaining-fuel range is estimated using an existing amount of fuel in the vehicle and a mileage rate of the vehicle. For example, the distance a vehicle can travel before it runs out of fuel is simply the remaining fuel volume multiplied by an estimated mileage rate of the vehicle to obtain an estimated attainable distance, $d^{est}$. The estimated mileage can be a running average, or could be filtered with external information such as temperature of the engine, outside temperature, tire pressure and the like to estimate a likely current mileage to obtain a more accurate estimated attainable distance. This value is then used to search for service station within the pie-shaped search region (as shown in FIG. 2).

Referring back to FIG. 3, it is preferred that the estimating step 40 also includes an estimated time until the vehicle runs out of fuel. This is important in those cases were the vehicle may not be attaining its best mileage, such as in heavy traffic. In this case, a more accurate range can be estimated by including the speed of the vehicle and dividing the previously estimated distance ($d^{est}$) by the speed of the vehicle to determine the estimated time of fuel remaining, $1^{est}$. The vehicle speed can be a running average, can be dynamically tracked in real time, or could be filtered with external information ahead of the vehicle on the planned route being traveled, such as traffic conditions, time of day, construction, speed limits, and the like, to estimate a more likely attainable range. This value is then used to modify the pie-shaped search region (as shown in FIG. 2) to provide a more realistic range before running out of fuel. Those skilled in the art will appreciate that myriad different kinds of information can come into this information pool of external conditions.

A next step includes establishing 44 a location and direction of travel of the vehicle. This can be done by using the processor of the on-vehicle systems, such as GPS as is known in the art, or by a network service provider using communication techniques known in the art. The location and direction are important for determining the apex, direction, and angular range of the pie-shaped search zone (as shown in FIG. 2).

A next step includes searching 46 a database for any service stations (or automobile repair shops, automobile dealerships, etc.) within the range of the estimating step and ahead of the location of the vehicle in the direction of travel of the vehicle, as defined by the pie-shape (as shown in FIG. 2). Specifically, the pie-shape covers a predetermined angular range to either side of the direction of travel of the vehicle and limited by the estimated range the vehicle can travel before becoming disabled. The database being searched can comprise an on-vehicle database by the communication system processor or a search for service stations by contacting 48 and requesting a database search from the network service provider. Although on-vehicle databases are known, these are usually not updated and therefore do not contain current information. Therefore, it is preferred that the vehicle makes contact 48 and requests the service provider to locate service stations within the pie-shaped zone defined previously.

The search can be filtered by looking for only those service stations that can provide the needed assistance, depending on the required maintenance. The search depends upon pre-defined criteria associated with each service station in the database. For example, only some service stations can provide towing assistance, and only some service stations can provide diesel fuel, etc. Such criteria are commonly categorized by service stations, as can be determined in a simple Yellow Pages phone book search, for example. Alternatively, the search can be filtered 50 by the vehicle or service provider using defined user preferences as will be explained below. Either an on-board vehicle processor or network service provider can also determine whether any interaction from the user is necessary in order to obtain further information.

It should be noted that, if no service stations are found 52 within the pie-shaped search zone, the angle of the sides of the axis of the pie-shape can be expanded 54 (such as to a semi-circle or larger) to include any service stations that are to the side or even behind the direction of travel of the vehicle. As shown in FIG. 2, such angle expansion 26 can then include more service stations (A, E). Referring back to FIG. 4, in the worst case, a complete circle around the vehicle could be searched 56 by the system processor, being the default case if the vehicle is stopped 58 (e.g. disabled), and which will find those service stations nearest to the location of the vehicle. If it is still the case that no service stations are found, the radius of the search circle can be expanded 60 until a service station is found. In addition, an automatic road side assistance call can be generated 62 if the vehicle is disabled, and the user can be present a close landmark or intersection location to give to guide a person coming to aid the driver.

If a network service provider database was searched, a next step would be downloading 64 the search results to the vehicle.

A next step would be presenting 66 the found service stations from the searching step to a driver of the vehicle, such that the user can choose a service station and be guided thereto, if desired, by an existing navigation system.

In practice, and referring back to FIG. 2, a vehicle 24 is shown on a roadway with regular one block street sectors 27. It is estimated that the vehicle 24 has enough fuel to travel a range 21 of about three blocks. The database shows that there are five service stations (A-E) ahead of the vehicle. In accordance with the present invention, the system will search ahead of the vehicle within a roughly pie-shaped search zone 22. Although there are four service stations (A-D) within the three block range of the vehicle, the system will list to the driver only those two stations (B-C) ahead of the vehicle that are convenient (i.e. close to the desired route) of the driver and within the three block range. The driver can then select the desired station and navigational instructions can be given for the selected destination. Although there is a closer station (E), the system does not select this since it is not convenient and there are other stations (B-C) available that are convenient and within range. If stations B-C were not present, the angular search range 23 would be expanded 26 to detect stations A and E. Station D, although convenient, is not selected due to its being out of range 21.

In a preferred embodiment, the method of the present invention includes the further steps of defining 68 user preferences (e.g. refueling preferences) of the driver, and filtering the found service stations in the searching step with these preferences. The user can also define a particular search range or shape, also. Referring back to FIG. 1, the user preferences 11 are stored, such as in a memory file 13, by a processor either on the communication device 14 or remotely-located on the network 12 and are coded per the vehicle or even the specific driver. The user preferences are identifiers or terms used in a search engine or as a filter (step 50 in FIG. 4) for downloaded information. The user preferences are input and coded by the communication device, either directly or through the user interface 16 or another interface device. The coded input is sent to the memory file 13 to key the search engine or filter downloaded information.

In particular, the coded user preferences can include, but are not limited to; an explicit command from a particular driver that can include a preference by voice command (e.g. "BP", "Mobil", etc.) or command entered on any other input interface of the communication device such as a keypad, touch screen, and the like included in the user interface 16; an implicit command derived from a physical sensor or memory instruction located in the vehicle (e.g. "diesel"); or a history of user preferences. Downloaded information from the searching step can then be filtered to find only BP service stations having diesel fuel. Moreover, the user preferences can allow a driver to custom configure the search area.

As those skilled in the art will appreciate, the time and distance information can be updated dynamically and automatically to change the estimated range as the vehicle travels to receive the necessary maintenance. Along these lines the system can also pick the next best choice in the list of service stations if the primary destination is passed, i.e. the driver misses or ignores the exit.

While the foregoing described embodiments have been set forth above, it will be appreciated to one skilled in the art that the invention described has applications beyond the described embodiments. Accordingly, it is intended that the scope of the invention including such alternatives, modifications, and variations contemplated shall be defined by the appended claims.

What is claimed is:

1. A method to provide navigational maintenance assistance for a vehicle, the method comprising the steps of:

triggering a maintenance warning using a sensor on the vehicle;

in response to the maintenance warning, estimating a range a vehicle can travel before a required maintenance will disable the vehicle;

establishing a location and direction of travel of the vehicle;

defining a search zone for searching for service stations, the search zone defined by at least (i) an axis along the direction of travel of the vehicle, (ii) the range from the estimating step, and (iii) an expandable angular range to either side of the axis, wherein the angular range is initially such that the search zone is limited to an area substantially ahead of the location of the vehicle in the direction of travel of the vehicle;

searching a database including service-station locations for any service stations located within the search zone;

if one or more service stations are found in the searching step, presenting the one or more service stations to a driver of the vehicle; and if no service station is found in the searching step, expanding the angular range of the search zone and returning to the searching step, wherein, if no service station is found in the searching step after expanding the angular range such that the search zone covers a substantially circular area around the location of the vehicle, further carrying out the steps of:

expanding a radius of the substantially circular area corresponding to the search zone and returning to the searching step, wherein the steps of expanding the radius and searching are carried out until at least one service station is found in the searching step.

2. The method of claim 1, wherein the required maintenance is a refueling of the vehicle, and wherein the estimating step includes estimating an amount of fuel available in the vehicle and estimating a mileage rate of the vehicle.

3. The method of claim 2, wherein the estimating step includes estimating a time of fuel remaining using a speed of the vehicle.

4. The method of claim 1, wherein the required maintenance is a refueling of the vehicle, and further comprising a preliminary step of triggering a low fuel warning depending upon a predetermined fuel volume, wherein the subsequent steps will only occur upon triggering of the low fuel warning.

5. The method of claim 1, wherein the required maintenance is a refueling of the vehicle, and further comprising the steps of:

defining refueling preferences of the driver, and filtering the one or more service stations found in the searching step with the refueling preferences.

6. The method of claim 1, wherein the estimating step includes receiving input on traffic conditions ahead of the vehicle on the route being traveled to estimate the range.

7. A method to provide navigational refueling assistance for a vehicle with a communication device in contact with a network of a service provider, the method comprising the steps of:

triggering a low fuel warning using a fuel level sensor;

in response to the low fuel warning, estimating a remaining-fuel range of the vehicle using an existing amount of fuel and a mileage rate of the vehicle;

establishing a location and direction of travel of the vehicle;

defining a search zone for searching for refueling stations, the search zone defined by at least (i) an axis along the direction of travel of the vehicle, (ii) the range from the estimating step, and (iii) an expandable angular range to either side of the axis, wherein the angular range is initially such that the search zone is limited to an area substantially ahead of the location of the vehicle in the direction of travel of the vehicle;

searching a refueling station database including refueling-station locations for any refueling stations located within the search zone, wherein the refueling station database is located on the service provider network;

if one or more refueling stations are found in the searching step, downloading content related to the one or more refueling stations from the service provider network to the communication device and presenting the downloaded content to a driver of the vehicle via a user interface;

if no refueling station is found in the searching step, expanding the angular range of the search zone and returning to the searching step, wherein, if no refueling station is found in the searching step after expanding the angular range such that the search zone covers a substantially circular area around the location of the vehicle, further carrying out the steps of:

expanding a radius of the substantially circular area corresponding to the search zone and returning to the searching step, wherein the steps of expanding the radius and searching are carried out until at least one refueling station is found in the searching step.

8. The method of claim 7, wherein the estimating step includes estimating a time of fuel remaining using a speed of the vehicle.

9. The method of claim 7, further comprising the steps of:

defining refueling preferences of the driver, and filtering the downloaded content with the refueling preferences.

10. The method of claim 7, wherein the estimating step includes receiving input from the service provider on traffic conditions ahead of the vehicle on the route being traveled.

\* \* \* \* \*